United States Patent
Futselaar et al.

(10) Patent No.: US 6,846,414 B2
(45) Date of Patent: Jan. 25, 2005

(54) MEMBRANE FILTRATION ELEMENT HAVING SLEEVE ELEMENT AND SOCKET MEMBERS

(75) Inventors: Harry Futselaar, Enschede (NL); Paul Erik Hoogeveen, Hengelo (NL)

(73) Assignee: X-Flow B.V., Almelo (NL)

( * ) Notice: Subject to any disclaimer, the term of this patent is extended or adjusted under 35 U.S.C. 154(b) by 0 days.

(21) Appl. No.: 10/132,689

(22) Filed: Apr. 26, 2002

(65) Prior Publication Data

US 2002/0162785 A1 Nov. 7, 2002

Related U.S. Application Data

(63) Continuation of application No. PCT/NL00/00794, filed on Nov. 2, 2000.

(30) Foreign Application Priority Data

Nov. 2, 1999 (NL) .............................................. 1013465

(51) Int. Cl.⁷ .............................................. B01D 63/00
(52) U.S. Cl. ............................. 210/321.88; 210/321.89; 210/321.61; 210/500.23
(58) Field of Search ....................... 210/321.61, 321.64, 210/321.67, 321.68, 321.72, 321.6, 321.78–321.81, 321.87–321.9, 500.23, 313.2; 95/45; 96/10

(56) References Cited

U.S. PATENT DOCUMENTS 3,832,830 A   9/1974 Gerow ........................ 55/158
4,578,190 A   3/1986 Fowler ..................... 210/321.1
5,639,373 A * 6/1997 Mahendran et al. ......... 210/636

FOREIGN PATENT DOCUMENTS

| EP | 0 009 374 | 12/1980 |
| EP | 0181470 | 5/1986 |
| EP | 0 288 030 | 4/1988 |
| EP | 0 481 433 | 4/1992 |
| JP | 62-204804 | 9/1987 |
| JP | 63-158103 | 7/1988 |
| JP | 4-25644 | 1/1992 |
| JP | 7-124445 | 5/1995 |
| JP | 11-179164 | 6/1999 |

* cited by examiner

*Primary Examiner*—Joseph Drodge
*Assistant Examiner*—Krishnan S Menon

(57) ABSTRACT

A membrane filtration unit comprises a housing having a feedstock inlet, a permeate outlet and a retentate outlet, at least one bundle of tubular membranes accommodated in the housing, sealing bodies which hold end parts of the membranes sealed in a fixed position with respect to the housing, and at least one flexible, permeable sleeve element which encloses the bundle of membranes and holds it together. The sleeve element encloses a center part, which is situated between the held end parts, of the bundle. Socket members are provided, which delimit transitional parts of the bundle, which transitional parts are situated at the location of the transitions from the end parts to the center part. Part of each socket member is fixedly connected with respect to the housing and part of each socket member movably encloses an end of the sleeve element.

15 Claims, 2 Drawing Sheets

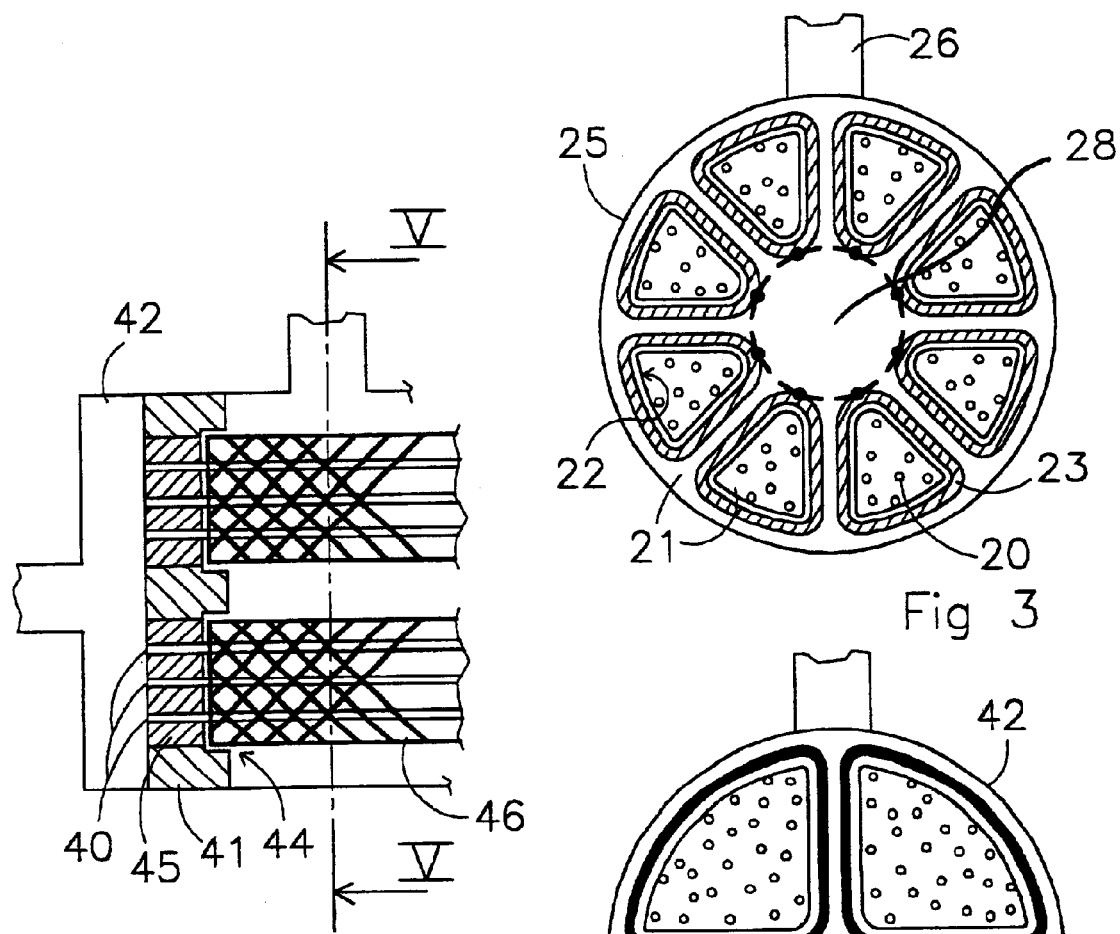
Fig 3
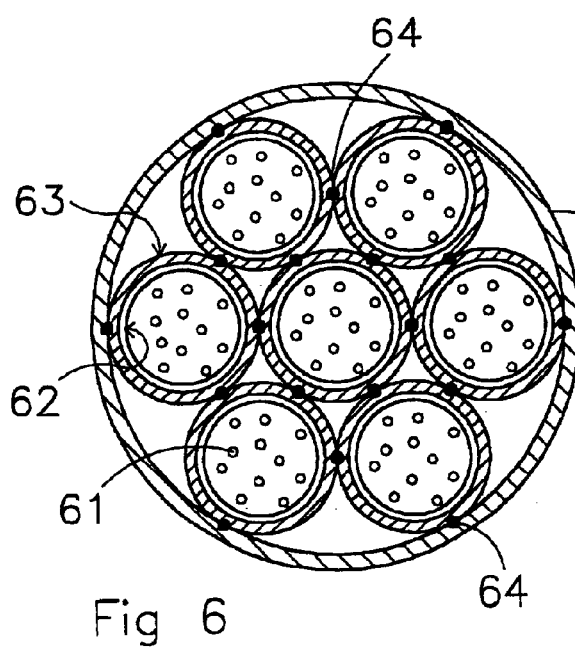
Fig 4
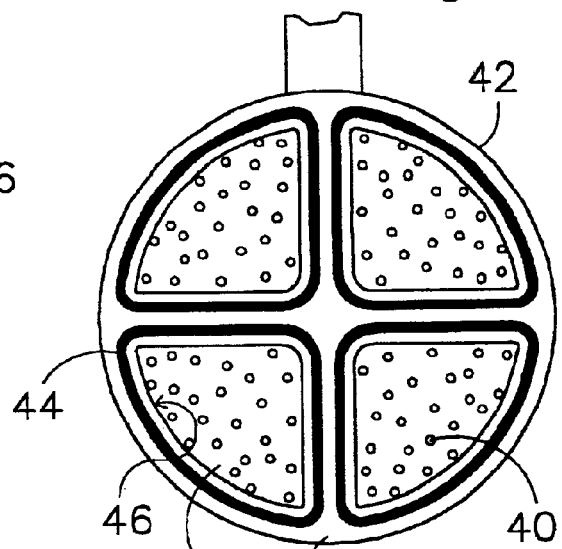
Fig 5
Fig 6

MEMBRANE FILTRATION ELEMENT HAVING SLEEVE ELEMENT AND SOCKET MEMBERS

CROSS-REFERENCE TO RELATED APPLICATION

This is a continuation application of PCT/NL00/00794 filed 2 Nov. 2000, which PCT-application claims priority of Dutch patent application number 1013465 filed 2 Nov. 1999, herein incorporated by reference.

FIELD OF THE INVENTION

The invention relates to a membrane filtration unit for separating a feedstock which is fed past a large number of tubular membranes into a permeate and a retentate.

BACKGROUND OF THE INVENTION

Numerous variants of membrane filtration units are known.

By way of example, EP-B-0 181 470 has disclosed a membrane filtration unit with a case-like housing in which there is a bundle of 5,000–10,000 hollow membrane fibres. End parts of the membrane fibres are embedded in resin-like sealing bodies which separate the housing into separate spaces, one which is in contact with the outer side and one which is in contact with the inner side of the membrane fibres.

A drawback of this known membrane filtration unit is that there is a considerable risk of the membrane fibres breaking during operation. The transitions from the embedded parts of the membrane fibres to those parts of the membrane fibres which are not embedded and extend between the embedded parts are particularly fragile. This imposes limits on process conditions (such as feedstock and backflush flow rates, maximum operating temperature and feedstock and backflush pressures) under which the unit can be used.

U.S. Pat. No. 3,832,830 shows a membrane filtration unit having a housing in which there is a bundle of more than a million hollow membrane fibres. Once again, end parts of the membrane fibres are embedded in resin-like sealing bodies. The bundle of membrane fibres is enclosed by a flexible, porous, elongate piece of tubing which extends over the entire length of the bundle and is likewise embedded in the resin-like sealing bodies. The flexible piece of tubing holds the bundle of membrane fibres together and imparts a certain rigidity and strength to these fibres. The piece of tubing facilitates positioning the enormous number of membrane fibres in the housing without the membrane fibres in the bundle being pressed flat or damaged. To reduce the risk of breakage at the location of the fragile transitional parts between the embedded and unembedded parts of the membrane fibres, the unit comprises elastic retaining elements which are arranged around the fragile transitional parts and part of which extend into the sealing bodies, to which they are fixedly connected by being embedded. At the location of the transitional parts, the elastic retaining elements wrap taut around the bundle of membrane fibres and the piece of tubing surrounding them, serving primarily to prevent resin being able to penetrate into the unembedded part of the bundle during production of the sealing bodies. As a result, the tightly wrapped transitional parts become inflexible.

A drawback of this known membrane filtration unit is that in practice it has been found that not only does the bundle of tightly wrapped transitional parts of the membrane fibres become inflexible, but a large part of the flexibility of the part of the bundle which is enclosed only by the piece of tubing is also lost. In addition, there are, as it were, new fragile transitional parts of the membrane fibres formed in the vicinity of the unembedded ends of the retaining elements, where there is a relatively high risk of the membrane fibres breaking. Furthermore, this membrane filtration unit is expensive and complex to produce.

JP-A-11179164 discloses a membrane module comprising a cylindrical housing in which a bundle of hollow fibre membranes is housed. The bundle of membranes is inserted into a water-permeable cover cylinder. The housing comprises end parts having a larger diameter, where resin partition walls are provided inside which the ends of the membranes are embedded. Both ends of the water-permeable cover cylinder are not buried in the resin partition walls.

SUMMARY OF THE INVENTION

The invention aims to overcome the above mentioned drawbacks and in particular to provide a membrane filtration unit which is simple and functions well, enabling optimum process conditions to be combined with a minimum risk of the membranes breaking.

According to the invention, this object is achieved by a membrane filtration unit, comprising a housing having a feedstock inlet, a permeate outlet and a retentate outlet, at least one bundle of tubular membranes which is accommodated in said housing, sealing bodies which securely hold end parts of said membranes sealed in a fixed position with respect to said housing and thus separate said housing into separate spaces, which spaces are in contact with inner side or outer sides of said membranes and are in open communication with said feedstock inlet or said permeate and retentate outlets, and at least one flexible, permeable sleeve element which partly encloses said bundle of membranes and holds them together, in which said flexible, permeable sleeve element encloses a centre part, which is situated between said securely held end parts, of said bundle of membranes, and wherein socket members are provided, which movably delimit transitional parts of said bundle of membranes, which transitional parts are situated at locations of transitions from said securely held end parts to said enclosed centre part, a first part of each socket member being fixedly connected with respect to said housing, and a second part of each socket member movably enclosing an end of said sleeve element such that said sleeve element can move with respect to said enclosing socket member and with respect to said sealing body. Thus the membrane filtration unit comprises a housing in which one or more bundles of tubular membranes are situated. End parts of the membranes are held sealed in a fixed position with respect to the housing in a sealing body. A centre part, which extends between the securely held end parts, of the bundle of membranes is to a large extent enclosed by a flexible, permeable sleeve element. At transitional parts between the securely held end parts and the enclosed centre part of the bundle of membranes, there are socket members, part of each of which is fixedly connected with respect to the housing, and another part of each of which encloses an end of the sleeve element. The way in which the socket members enclose the sleeve element is such that the sleeve element can move slightly with respect to the socket members. Since the flexible sleeve element is rigidly connected neither to the sealing bodies nor to the socket members, a certain flexibility remains in the bundle of membranes, so that flow forces which act on the bundle of membranes in operation can be reduced. The sleeve element limits the freedom of movement, with the result that some rigidity and strength is imparted to the bundle of membranes, making the bundle less fragile. In addition, the sleeve element makes it easier to arrange the membranes in the housing. At the location of the transitional parts, the sleeve element is moveably delimited between the socket members. In that area, the enclosing limitations ensure that there is a considerably reduced risk of the membranes breaking. Therefore, the invention is partly based on the insight that the risk of membranes in a membrane filtration unit breaking can be minimised by providing the membranes as a bundle with a flexible enclosure comprising a permeable sleeve element which, at the location of fragile transitional parts of the membranes, is moveably delimited by means of socket members.

The socket member according to the present invention preferably encloses the sleeve element in such a manner that they can slide in the longitudinal direction with respect to one another. In this case, the bundle of membranes is delimited by the socket members in a direction perpendicular to the longitudinal direction of the membranes, while during operation the forces can be reduced by the sleeve element sliding in the socket member. If the connection were rigid, the tendency of the tubular membranes to expand under conditions of use (such as moisture, temperature and pressure) could cause them to break, but according to the invention this tendency can be absorbed by means of the sleeve element sliding.

Advantageously, at least that part of the socket member which encloses the sleeve element is permeable. Consequently, the action of the enclosed parts of the membranes is scarcely restricted, if at all, by the socket members, the effective membrane surface area remains as large as possible and there are no longer any dead spaces.

Further preferred embodiments are defined in the subclaims.

BRIEF DESCRIPTION OF THE DRAWINGS

The invention will be explained in more detail with reference to the appended drawing, in which:

FIG. 3 shows a cross-sectional view on line III—III in FIG. 2;

FIG. 4 shows a highly diagrammatic partial view, corresponding to that shown in FIG. 1, of a variant embodiment with a tube plate;

FIG. 5 shows a cross-sectional view on line V—V in FIG. 4; and

FIG. 6 shows a highly diagrammatic view, corresponding to that shown in FIGS. 3 and 5, of a variant embodiment having a plurality of socket members which are connected to one another and to a housing.

DESCRIPTION OF THE PREFERRED EMBODIMENTS

Figure 1:
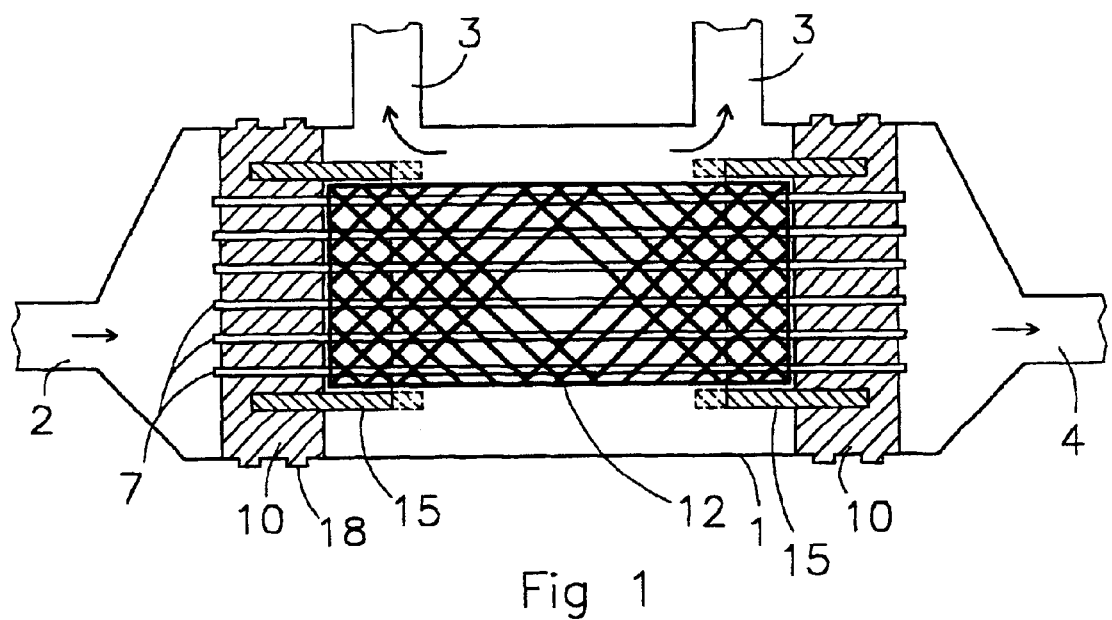
FIG. 1 is a highly diagrammatic view, in longitudinal section, of a membrane filtration unit according to the invention with one bundle of tubular membranes.

The membrane filtration unit shown in FIG. 1 comprises a housing 1 having a feedstock inlet 2, permeate outlets 3 and a retentate outlet 4. Inside the housing 1 there is a bundle comprising tubular membranes 7, only a few of which are illustrated. The tubular membranes are formed, for example, by self-supporting membranes, such as hollow fibres or capillaries. End parts of the membranes 7 are embedded in sealing bodies 10. Between the securely held end parts of the membranes 7 there are centre parts which, as a bundle, are enclosed and held together by a flexible, permeable sleeve element 12. The sleeve element 12 is not embedded in the sealing bodies 10. The unit also comprises socket members 15. Part of each socket member 15 is embedded in the sealing body 10, and another part of each socket member 15 encloses an end of the sleeve element 12. The socket member 15 and the end of the sleeve element 12 are not connected to one another. The way in which the end of the sleeve element 12 is enclosed is such that it can slide inside the socket member 15 in the longitudinal direction of the bundle of membranes 7. This ability of the sleeve element to slide means that a certain flexibility is retained in the bundle of membranes 7, by means of which flow forces which are exerted on the bundle of membranes during operation can be reduced. The transitional parts at the location of the transitions from the securely held end parts to the enclosed centre parts of the membranes 7 are virtually unable to move in a direction perpendicular to the longitudinal direction of the membranes 7, since in this direction they are delimited by the socket member 15. It should be noted that, for the sake of clarity, the clearance between the sleeve element 12 and the socket member 15 has been portrayed as larger than that which is actually required in practice for the unit to operate successfully. As a result, there is sufficient protection against the membranes 7 breaking off or becoming damaged at these transitional parts. The measures according to the invention make it possible to use the membrane filtration unit under more optimum operating conditions. The feedstock flowrates, the operating temperature and the feedstock pressures may be greater than in the prior art. It is also possible to use greater backflush flowrates and backflush pressures during a cleaning operation in which a cleaning liquid, for example permeate, is passed through the unit in the reverse direction. If desired, a feedstock medium which is to be filtered may also flow through the membrane filtration unit in the opposite direction. By way of example, the left-hand tube 3 can be used as a feedstock inlet, while the right-hand tube 3 is used to discharge retentate. The tubes 2 and 4 can both be used for discharging permeate.

That part of the socket member 15 which encloses the sleeve element 12 is preferably permeable. In this way, the effective membrane surface area of the bundle of membranes 7 can be utilized optimally. Furthermore, those parts of the socket member 15 which enclose the sleeve element 12 are preferably designed to be sufficiently long, as indicated by dashed lines in FIG. 1, for them to extend across the front of the entire permeate outlet 3. The socket members 15 can then advantageously be used as buffer plates, for example if the permeate outlets 3 are used to supply a cleaning liquid during a cleaning operation. The cleaning liquid can then be supplied under high pressure and/or at high flow rates without there being any risk of a forceful incoming flow damaging the bundle of membranes 7.

The sealing body 10 is directly connected to the housing 1. To improve the connection between the sealing body and the housing 1, circumferential grooves 18 are provided in the housing 1. The circumferential grooves 18 increase the contact area between the housing 1 and the sealing body 10 and prevent axial sliding of the sealing body 10 during operation. The latter effect is important in particular because the feedstock and permeate pressures may and can be greater by virtue of the invention, and consequently the forces acting on the sealing body 10 may also be greater.

That part of the socket member 15 which is embedded in the sealing body 10 is preferably produced with an open or porous structure. For example, if the sealing body 10 is made from a resin-like substance, this substance can penetrate into the open or porous structure in the socket member 15. This leads to a good connection between the socket member 15 and the sealing body 10.

Figure 2:
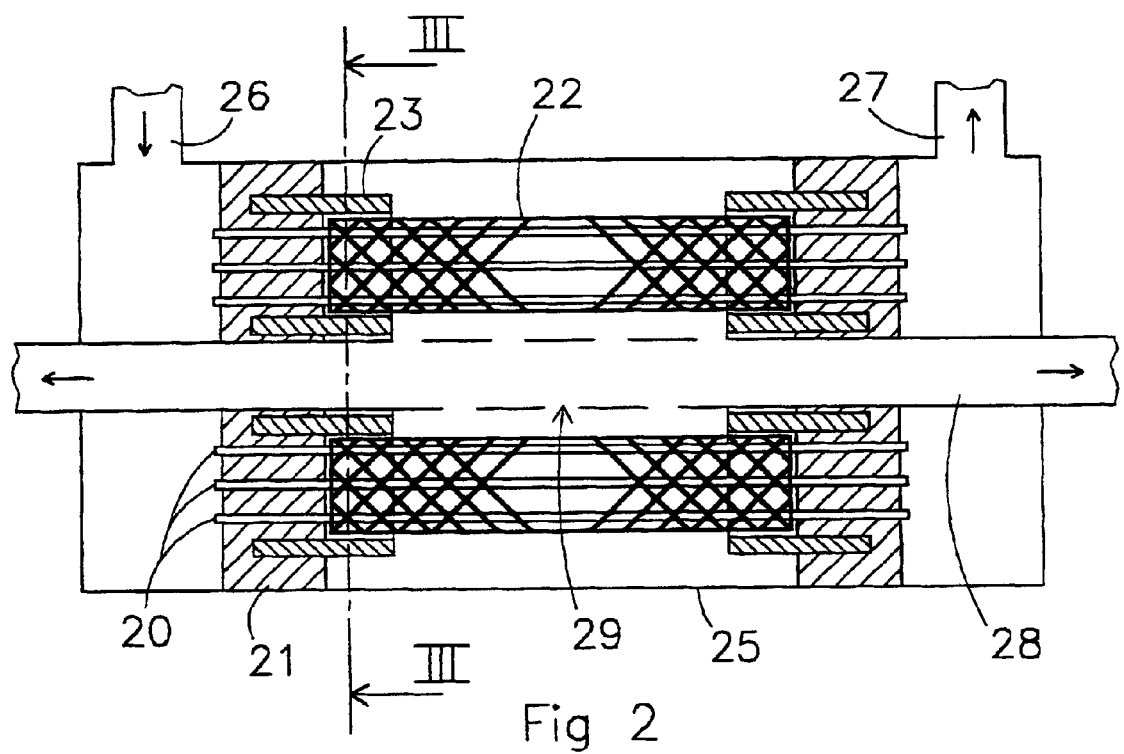
FIG. 2 shows a view corresponding to that shown in FIG. 1 of a variant embodiment having a plurality of bundles of tubular membranes.

In the variant shown in FIGS. 2 and 3, the membrane filtration unit comprises eight bundles of tubular membranes 20. Those ends of the membranes 20 which lie at one end are embedded in one sealing body 21. Each bundle of membranes 20 is enclosed, in the same way as in FIG. 1, by a flexible, permeable sleeve element 22, the outer ends of which are delimited by socket members 23 in such a manner that it can slide in the longitudinal direction. The plurality of bundles of membranes 20 are accommodated in a housing 25 which comprises a feedstock inlet 26, a retentate outlet 27 and a central permeate outlet tube 28. The outlet tube 28 extends in the longitudinal direction through the centre of the housing 25 and is provided with a plurality of inflow openings 29 in the space between the sealing bodies 21.

Advantageously, the socket members 23 which lie at the same end are connected either to one another, or each to the central permeate outlet tube 28, or to one another and to the central permeate outlet tube 28. In this way, particularly if combined with the abovementioned possibility of porous or spongy socket members, the result is an assembly of socket members 23 which serves as reinforcement for the material of the sealing body 21. The rigidity and strength of the sealing body 21 increases as a result. This in turn has the advantage that the body can be of thinner design which on the one hand is of benefit to the effective membrane surface area and on the other hand creates a unit which can be produced at lower cost. Another advantage is that it is possible to use larger module diameters without having to have a thicker sealing body. In a variant, the socket members are separately or jointly attached to the inner side of the housing 25, for example by means of adhesive bonding.

The socket member 23 is advantageously made from a material which is rigid compared to the sleeve element 22. The socket members 23 are formed in such a manner that they impart a desired shape to the less rigid sleeve elements 22. The advantage of this can be seen, for example, from FIG. 3, which shows that the plurality of bundles of membranes 20 are accommodated in an optimally packed arrangement around the permeate outlet tube 28 in the housing 25. The socket members 23 are made, for example, from a plastically deformable material.

The membrane filtration unit shown in FIGS. 2 and 3 can easily be adapted in such a manner that incoming flow in the opposite direction and/or backflushing with a cleaning liquid becomes possible. In this case, the central tube 28 can be used as a feedstock inlet, and the tubes 26 and 27 can be used as permeate outlets. As a result of the housing 25 being provided with an additional outlet in its centre part, this outlet can be used as a retentate outlet and medium can flow into the entire unit in the opposite direction.

FIGS. 4 and 5 show the left-hand end part of a membrane filtration unit with four bundles of membranes 40. At the location of the ends of the membranes 40, there is a tube plate 41 which is fixedly connected to a housing 42. The tube plate 41 comprises four cutouts 44. An outer part of each cutout 44 is intended to accommodate and be connected in a sealed manner to a sealing body 45 in which the end parts of the membranes 40 are embedded. An inner part of each cutout 44 is intended to moveably delimit a sleeve element 46 which encloses the bundle of membranes 40. Together with the peripheral walls of the cutouts 44, the tube plate 41 forms an integral assembly of socket members. The tube plate 41 is easy to produce. Moreover, an assembly of a plurality of bundles of membranes 40, tube plates 41 and sealing bodies 45 can be prepared outside the housing 42, and this assembly can then be arranged in the housing 42, after which all that remains is to connect the tube plates 41 to the housing 42 in a sealed manner. Moreover, if these connections are made to be dismantleable, it is possible to carry out repairs or maintenance work on the interior of the membrane filtration unit.

FIG. 5 also clearly shows that the cutouts 44 in the tube plate 41 are shaped in such a manner that the bundles of membranes 40 can be positioned in a closely packed arrangement in the housing 42.

The tube plate shown in FIGS. 4 and 5 may be made from a solid material but is advantageously made from a porous or spongy material, so that it can be strongly reinforced with the material of the sealing element. In a variant, the tube plate is made from the same material as the material for the sealing bodies. In this case, during a production operation, the ends of the sleeve elements have to be prepared in such a manner that they are not permanently connected to the material of the sealing body or the tube plate. This can be achieved, for example, by lubricating the ends of the sleeve element with vaseline, teflon or the like.

FIG. 6 shows a cross section through a substantially cylindrical housing 60 in which seven bundles of tubular membranes 61 are accomodated in an optimally packed arrangement. Each bundle of membranes 61 is enclosed by a sleeve element 62 which, at its end, is moveable delimited by a socket member 63. The socket members 63 are in this case likewise of substantially cylindrical design. The plurality of socket members 63 are connected to one another and to the housing 60, as diagrammatically indicated by thick spots 64. The assembly of socket members 63 is rigid and strong and, furthermore, reinforces the housing 60. Like the embodiment shown in FIGS. 2 and 3, the assembly may advantageously be used as a reinforcement for the material of one sealing body in which the assembly is partially embedded. The embedded socket members are preferably of permeable design, so that the material of the sealing body can penetrate successfully from all sides and can form an integral, strong unit with the assembly of socket members.

A problem which is frequently encountered when embedding ends of tubular membranes in a resin-like sealing body in a housing is that, particularly if there are relatively great amounts of resin, cooling leads to the formation of shrinkage cracks at the location where the sealing body is connected to the housing wall. Surprisingly, it has been found that this problem is overcome according to the invention by the use of an end plate with a porous or spongy structure in which a cutout is provided for accommodating a sealing body with embedded membrane end parts. The porous or spongy structure not only provides a very good connection between the material of the sealing body and the end plate, but also prevents the formation of shrinkage cracks. The use of a sealing body with a reinforcement means that the amount of resin-like material required is less than without a reinforcement (while retaining the mechanical properties), so that this smaller quantity means that the temperature increase becomes less critical, leading to a production process which can be implemented more successfully. The end plates with a porous or spongy structure can be used to good effect both in membrane filtration units according to the invention with moveably delimited sleeve elements and in other types of membrane filtration units, in which sleeve elements may optionally be embedded in the sealing body or may be omitted altogether.

Besides the embodiments shown, numerous variants are possible. In a variant which is not shown, the socket members or the cutouts in the tube plate are of cylindrical design and the bundles of membranes accordingly extend in the form of a cylinder through the housing. In another variant, the individual socket members are made from a material, for example glass fibre or a woven stocking, which is securely anchored on the side of the sealing element, while flexibility and movement in the longitudinal direction are possible on the side of the sleeve element. As an alternative to the slideable connection between the socket member and the sleeve element, these components may then be moveably connected to one another. As an alternative to a substantially straight bundle of tubular membranes with sealing bodies provided at opposite ends, it is also possible for the bundle to be arranged in a curve, for example even in a U shape, in which case the two ends are positioned next to one another and can then be embedded in a single sealing body.

The invention provides a highly advantageous membrane filtration unit which can be used for prolonged periods under high pressures and with high yields for filtering a feedstock liquid. The risk of leaks resulting from damage to the membranes is minimized on account of sleeve elements which enclose bundles of membranes being moveably delimited.

What is claimed is:

1. Membrane filtration unit, comprising:
   a housing having a feedstock inlet, a permeate outlet and a retentate outlet;
   at least one bundle of tubular membranes which is accommodated in said housing;
   sealing bodies which securely hold end parts of said membranes sealed in a fixed position with respect to said housing and thus separate said housing into separate spaces, which spaces are in contact with inner or outer sides of said membranes and are in open communication with said feedstock inlet or said permeate and retentate outlets; and
   at least one flexible, permeable sleeve element which partly encloses said bundle of membranes and holds them together; in which said flexible, permeable sleeve element encloses a centre part, which is situated between said securely held end parts, of said bundle of membranes, wherein socket members are provided, which movably delimit transitional parts of said bundle of membranes, which transitional parts are situated at locations of transitions from said securely held end parts to said enclosed centre part, a first part of each socket member being fixedly connected with respect to said housing, and a second part of each socket member movably enclosing an end of said sleeve element such that said sleeve element can move with respect to said enclosing socket member and with respect to said sealing body.

2. Membrane filtration unit according to claim 1, in which said socket member slidebly encloses said end of said sleeve element such that said sleeve element can slide in a longitudinal direction of said bundle of membranes with respect to said enclosing socket member.

3. Membrane filtration unit according to claim 1, in which said second part of the socket member is permeable.

4. Membrane filtration unit according to claim 1, in which said sealing body is directly connected to said housing, and in which said first part of said associated socket member is embedded in material of said sealing body.

5. Membrane filtration unit according to claim 4, in which said embedded part of said socket member is made from a material which is permeable.

6. Membrane filtration unit according to claim 1, in which said socket member is directly connected to said housing, and said associated sealing body adjoins said socket member in a sealed manner.

7. Membrane filtration unit according to claim 1, in which said socket member is made from a material which is rigid compared to said sleeve element.

8. Membrane filtration unit according to claim 1, in which a plurality of bundles of tubular membranes are provided.

9. Membrane filtration unit according to claim 8, in which a plurality of socket members are provided for said plurality of bundles, in which socket members being located at same ends of said bundles are connected to one another.

10. Membrane filtration unit according to claim 9, in which said socket members which are located at said same ends form part of an integrated tube plate, in which cut-outs are provided for moveably delimiting each sleeve element in a first part of an associated cut-out, while in a second part of this cut-out an associated bundle of tubular membranes is connected to said tube plate in a sealed manner by means of an associated sealing body.

11. Membrane filtration unit according to claim 1, in which said feedstock inlet or said permeate or retentate outlet of said space which is in contact with said outer side of said membranes is provided at the location of a socket member which, during operation or during a cleaning action, serves as a buffer plate for protecting said bundle of membranes from an incoming flow of liquid.

12. Membrane filtration unit according to claim 1, in which said tubular membranes ate self-supporting.

13. Membrane filtration unit according to claim 1, wherein the bundle of tubular membranes is U-shaped.

14. Membrane filtration unit, comprising:
    a housing having a feedstock inlet, a permeate outlet and a retentate outlet;
    at least one bundle of tubular membranes which is accommodated in said housing;
    sealing bodies which securely hold end parts of said membranes sealed in a fixed position with respect to said housing and thus separate said housing into separate spaces, which spaces are in contact with inner or outer sides of said membranes and are in open communication with said feedstock inlet or said permeate and retentate outlets; and
    at least one flexible, permeable sleeve element which partly encloses said bundle of membranes and holds them together; in which said flexible, permeable sleeve element encloses a center part, which is situated between said securely held end parts, of said bundle of membranes, wherein socket members are provided, which movably delimit transitional parts of said bundle of membranes, which transitional parts are situated at locations of transitions from said securely held end parts to said enclosed center part, a first part of each socket member being fixedly connected with respect to said housing, and a second part of each socket member movably enclosing an end of said sleeve element such that said sleeve element can slide in a longitudinal direction of said bundle of membrane with respect to said enclosing socket member.

15. Membrane filtration unit, comprising:
    a housing having a feedstock inlet, a permeate outlet and a retentate outlet;
    at least one bundle of tubular membranes which is accommodated in said housing;
    sealing bodies which securely hold end parts of said membranes sealed in a fixed position with respect to said housing and thus separate said housing into separate spaces, which spaces are in contact with inner or outer sides of said membranes and are in open communication with said feedstock inlet or said permeate and retentate outlets; and at least one flexible, permeable sleeve element which partly encloses said bundle of membranes and holds them together; in which said flexible, permeable sleeve element encloses a center part, which is situated between said securely held end parts, of said bundle of membranes, wherein socket members are provided, which movably delimit transitional parts of said bundle of membranes, which transitional parts are situated at locations of transitions from said securely held end parts to said enclosed center part, a first part of each socket member being fixedly connected with respect to said housing, and a second part of each socket member movably enclosing an end of said sleeve element by containing a clearance between the sleeve element and the socket members such that said sleeve element can move with respect to said enclosing socket member and with respect to said sealing body.

* * * * *